United States Patent
Sachs et al.

(10) Patent No.: US 9,365,143 B2
(45) Date of Patent: Jun. 14, 2016

(54) REAR SEAT MODULAR CUSHION

(71) Applicant: Ford Global Technologies, LLC, Dearborn, MI (US)

(72) Inventors: Adam Sachs, Oak Park, MI (US); Benjamin Craig, Berkley, MI (US); Christian J. Hosbach, Allen Park, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 14/104,780

(22) Filed: Dec. 12, 2013

(65) Prior Publication Data
US 2015/0165950 A1    Jun. 18, 2015

(51) Int. Cl.
| | |
|---|---|
| B60N 2/68 | (2006.01) |
| B60N 2/70 | (2006.01) |
| B60N 2/62 | (2006.01) |
| A47C 7/18 | (2006.01) |
| B60R 7/04 | (2006.01) |

(52) U.S. Cl.
CPC .............. B60N 2/7005 (2013.01); A47C 7/18 (2013.01); B60N 2/62 (2013.01); B60N 2/68 (2013.01); B60N 2/70 (2013.01); B60R 7/043 (2013.01)

(58) Field of Classification Search
CPC ....... B60N 2/68; B60N 2/7017; B60N 2/7035
USPC .................. 297/232, 452.21, 452.22, 452.23, 297/452.25, 452.27
See application file for complete search history.

(56) References Cited

U.S. PATENT DOCUMENTS

| | | | |
|---|---|---|---|
| 2,958,369 A | 11/1960 | Pitts et al. | |
| 3,403,938 A | 10/1968 | Cramer et al. | |
| 3,612,607 A * | 10/1971 | Lohr | 297/452.27 |
| 3,929,374 A | 12/1975 | Hogan et al. | |
| 4,324,431 A | 4/1982 | Murphy et al. | |
| 4,334,709 A | 6/1982 | Akiyama et al. | |
| 4,353,595 A | 10/1982 | Kaneko et al. | |
| 4,541,669 A | 9/1985 | Goldner | |

(Continued)

FOREIGN PATENT DOCUMENTS

| | | |
|---|---|---|
| EP | 0754590 | 1/1997 |
| EP | 0926969 | 1/2002 |

(Continued)

OTHER PUBLICATIONS

Freedman Seating Company, "Go Seat," http://www.freedmanseating.com/images/uploads/files/GOSeat_Brochure_10-19.pdf (date unknown).

(Continued)

*Primary Examiner* — Peter Brown
(74) *Attorney, Agent, or Firm* — Vichit Chea; Price Heneveld LLP

(57) ABSTRACT

A vehicle seating assembly includes a composite support structure formed by a lower pressure compression mold and defines at least one open section. A subassembly is disposed over the composite support structure and includes a trim piece integrally formed on the subassembly and defines a center seat and at least one cushion attachment support is disposed adjacent to the at least one open section. A seat cushion insert is operably coupled to the at least one cushion attachment support and is disposed over the at least one open section and defines a side seat.

18 Claims, 5 Drawing Sheets

(56) References Cited

U.S. PATENT DOCUMENTS

| | | | |
|---|---|---|---|
| 4,629,248 A | 12/1986 | Mawbey | |
| 4,720,141 A | 1/1988 | Sakamoto et al. | |
| 4,726,086 A * | 2/1988 | McEvoy | 5/653 |
| 4,822,092 A | 4/1989 | Sweers | |
| 4,861,104 A | 8/1989 | Malak | |
| 4,915,447 A | 4/1990 | Shovar | |
| 5,018,790 A * | 5/1991 | Jay | 297/452.26 |
| 5,067,772 A * | 11/1991 | Koa | 297/452.55 |
| 5,171,062 A | 12/1992 | Courtois | |
| 5,174,526 A | 12/1992 | Kanigowski | |
| 5,518,294 A | 5/1996 | Ligon, Sr. et al. | |
| 5,544,942 A * | 8/1996 | Vu Khac et al. | 297/452.37 |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,882,073 A * | 3/1999 | Burchi et al. | 297/218.2 |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,106,071 A | 8/2000 | Aebischer et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,199,252 B1 * | 3/2001 | Masters et al. | 29/91.1 |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,445,292 B2 * | 11/2008 | Moule | 297/452.25 |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,850,247 B2 | 12/2010 | Stauske et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,196,887 B2 | 6/2012 | Dahlbacka et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 8,360,530 B2 * | 1/2013 | Onoda et al. | 297/452.27 |
| 8,540,318 B2 * | 9/2013 | Folkert et al. | 297/452.53 |
| 8,696,067 B2 * | 4/2014 | Galbreath et al. | 297/452.1 |
| 2004/0084937 A1 * | 5/2004 | Berta | 297/180.14 |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0038937 A1 | 2/2010 | Andersson et al. | |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |

(56) References Cited

U.S. PATENT DOCUMENTS

| | | |
|---|---|---|
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

Metro Magazine, "Vehicle Seating Manufacturers Offer Flexible Design Options, Enhanced Construction," http://www.metro-magazine.com/article/print/2012/01/vehicle-seating-manufacturers-offer-flexible-design-options-enhanced-construction.aspx, Jan. 2012.

M. Grujicic et al., "Seat-cushion and soft-tissue material modeling and a finite element investigation of the seating comfort for passenger-vehicle occupants," Materials and Design 30 (2009) 4273-4285.

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

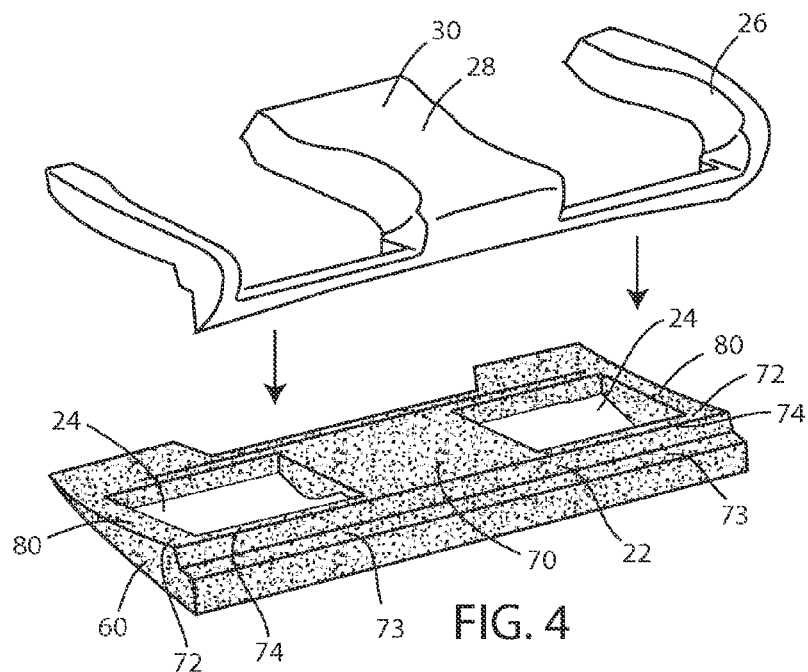
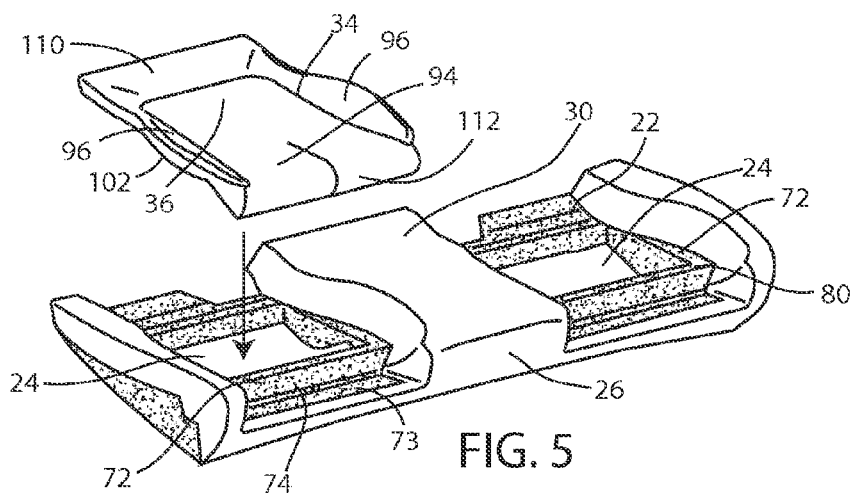
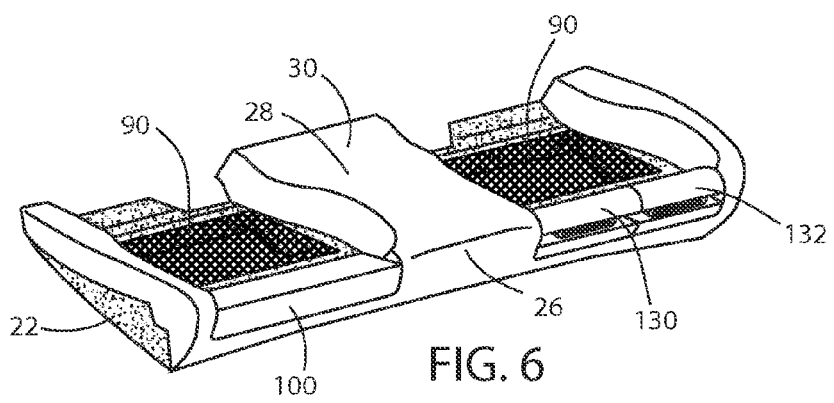

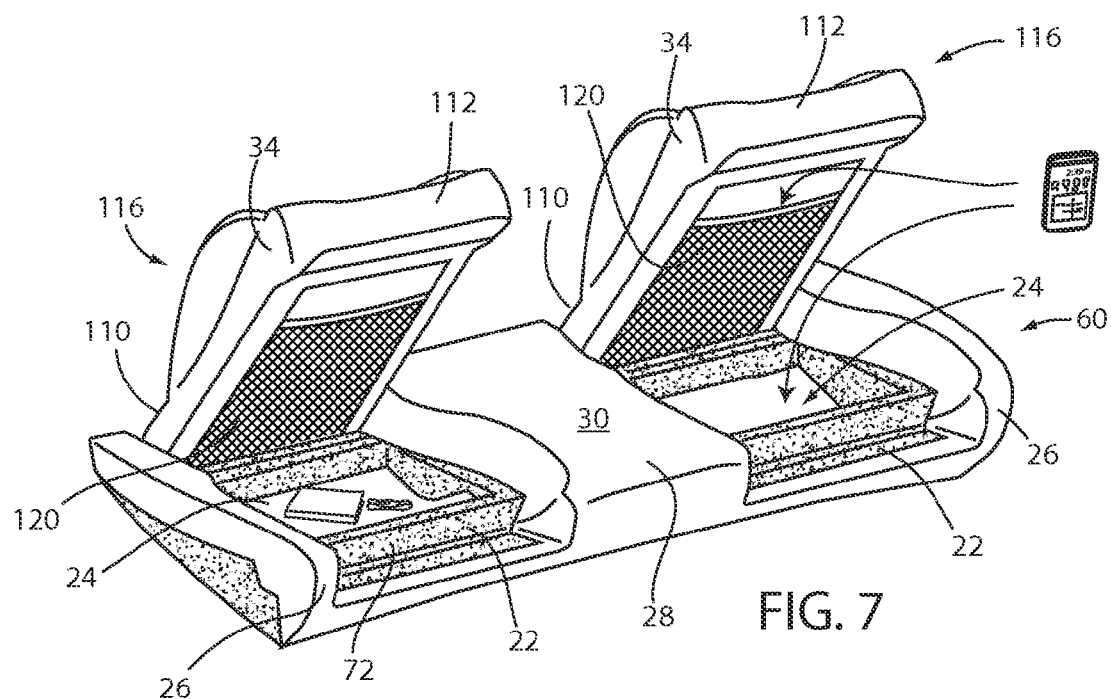
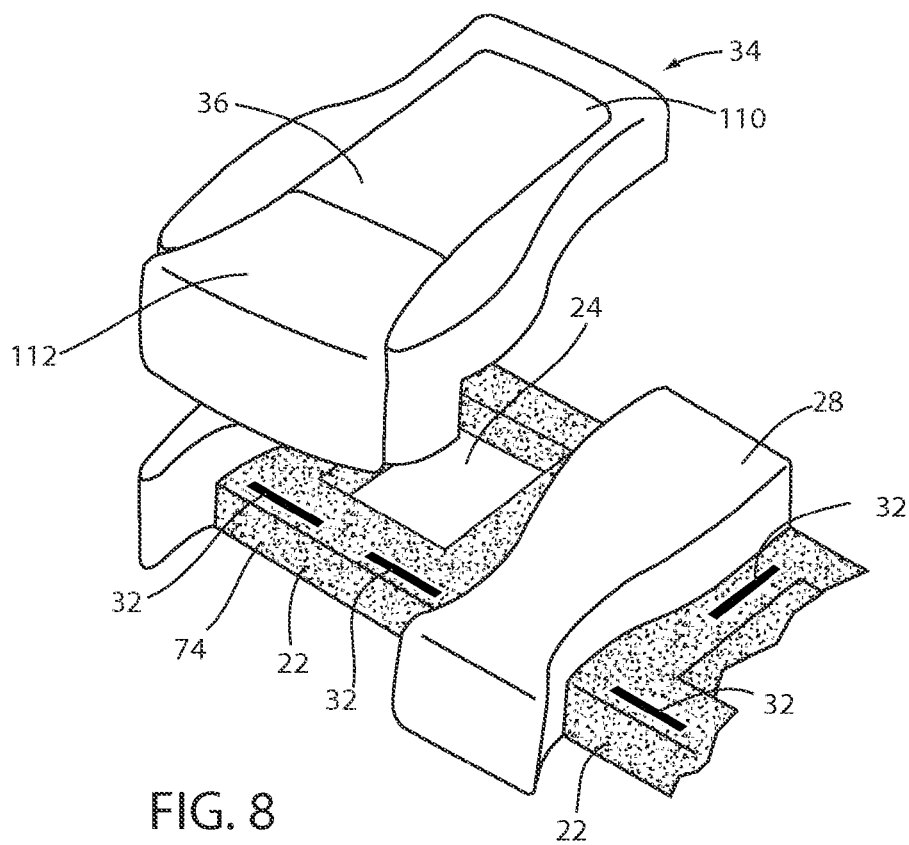

REAR SEAT MODULAR CUSHION

FIELD OF THE INVENTION

The present invention generally relates to a vehicle seating assembly, and more particularly to a vehicle seating assembly having a modular seating assembly design.

BACKGROUND OF THE INVENTION

Vehicles that include modular seating designs provide increased comfort and value to the consumer.

SUMMARY OF THE INVENTION

According to one aspect of the present invention, a vehicle seating assembly includes a composite support structure formed by a lower pressure compression mold and defines at least one open section. A subassembly is disposed over the composite support structure and includes a trim piece integrally formed on the subassembly and defines a center seat and at least one cushion attachment support is disposed adjacent to the at least one open section. A seat cushion insert is operably coupled to the at least one cushion attachment support and is disposed over the at least one open section and defines a side seat.

According to another aspect of the present invention, a frameless seating assembly for a vehicle includes a low pressure compression molded composite support structure defining first and second open sections. An overmolded subassembly is operably coupled to the composite support structure and defines a center seat. First and second cushion inserts are operably coupled to the support structure and are disposed over the first and second open sections to define first and second side seats.

According to yet another aspect of the present invention, a vehicle seating assembly includes a low pressure compression molded composite support structure. A subassembly is disposed over the composite support structure and defines a center seat and first and second side openings. First and second seat cushion inserts are operably coupled via snap-fit connection to the support structure.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a front perspective view of a composite support structure according to one embodiment of the present invention;

FIG. 5 is a partial front perspective view of the vehicle seating assembly according to one embodiment of the present invention;

FIG. 6 is a partial front perspective view of the vehicle seating assembly according to one embodiment of the present invention having a seat cushion insert removed;

FIG. 7 is a partial front perspective view of the vehicle seating assembly according to one embodiment of the present invention;

FIG. 8 is a partial front perspective view of the vehicle seating assembly according to one embodiment of the present invention;

DETAILED DESCRIPTION OF EMBODIMENTS

Figure 1:
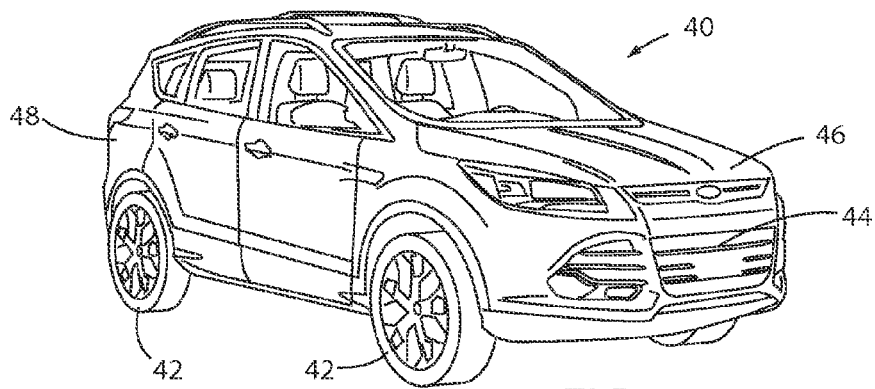
FIG. 1 is a front perspective view of a vehicle having a vehicle seating assembly according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-12, reference numeral 20 generally designates a vehicle seating assembly including a composite support structure 22 formed by a lower pressure compression mold and defines at least one open section 24. A sub-assembly 26 is disposed over the composite support structure 22 and includes a trim piece 28 integrally formed on the sub-assembly 26 and defines a center seat 30 and at least one cushion attachment support 32 is disposed adjacent to the at least one open section 24. A seat cushion insert 34 is operably coupled to the at least one cushion attachment support 32 and is disposed over the at least one open section 24 and defines a side seat 36.

Figure 2:
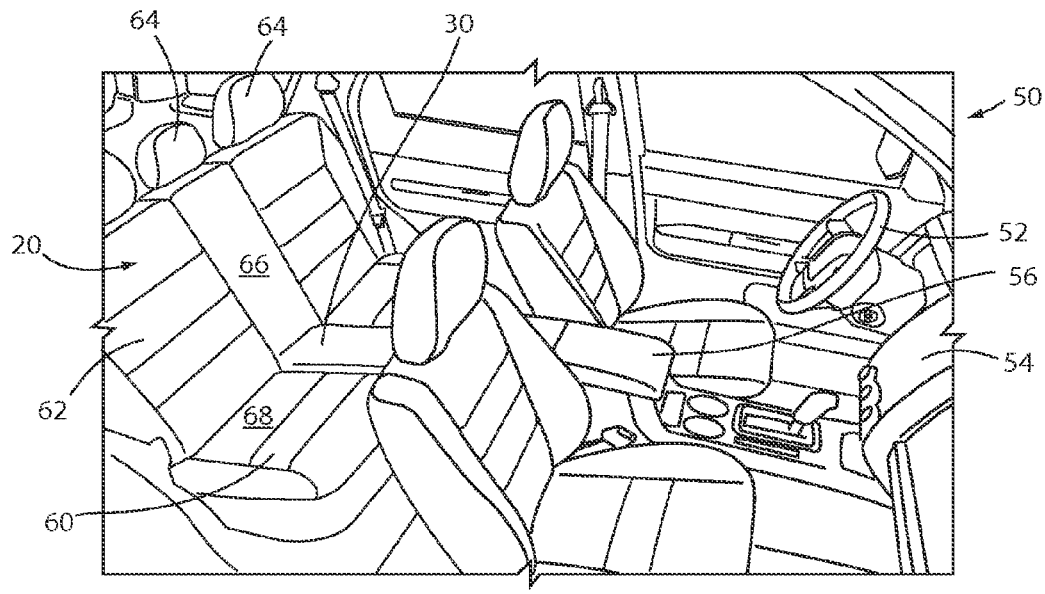
FIG. 2 is a front perspective view of a vehicle interior having the vehicle seating assembly according to one embodiment of the present invention.

Referring again to FIG. 1, a vehicle 40 includes the vehicle seating assembly 20 and also includes other features such as multiple wheels 42, a bumper 44, a front end 46, and a rear end 48. The vehicle 40 may be of any type including a compact vehicle, a mid-size vehicle, a sport utility vehicle, a mini or full size van, or any type of truck. As illustrated in the embodiment shown in FIG. 2, an interior 50 of the vehicle 40 may include multiple vehicle seating assemblies 20. The vehicle seating assembly 20 of the present invention, as shown in the embodiment of FIG. 2, is generally a rear passenger vehicle seat, however, it is also contemplated that the vehicle seating assembly 20 may be a front passenger vehicle seat having a driver's seat, a passenger's seat, and a center seat. The interior 50 of the vehicle 40 may also include other features such as a steering wheel 52, a dashboard 54, a center console 56 for extra storage, etc. The interior 50 of the vehicle 40 may also include multiple vehicle seating assemblies 20, for example in the rear passenger seat and the front driver/ passenger seat. However, it is also contemplated that the vehicle interior 50 may include only a single vehicle seating assembly 20 which includes the modular seating assembly design.

Figure 3:
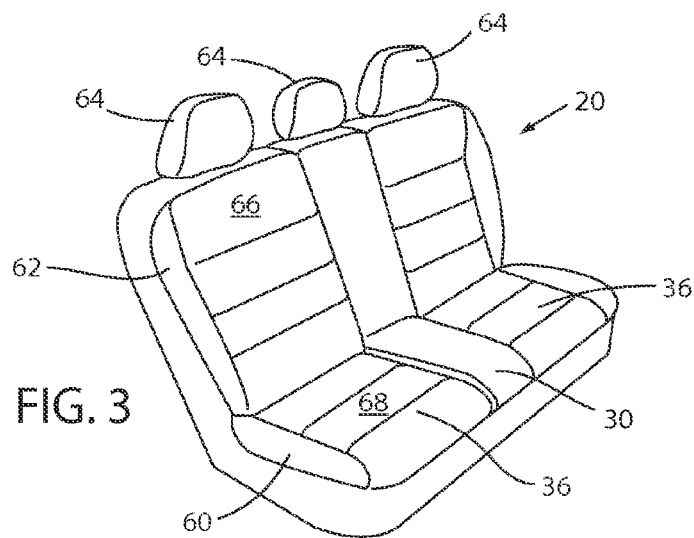
FIG. 3 is a front perspective view of the vehicle seating assembly according to one embodiment of the present invention.

Referring now to the embodiment illustrated in FIG. 3, the vehicle seating assembly 20 includes a seat base portion 60 and a seat back portion 62. In the illustrated embodiment, both the seat base portion 60 and the seat back portion 62 include the composite support structure 22, the sub-assembly 26 disposed over the composite support structure 22, and the seat cushion insert 34. The vehicle seating assembly 20 may also include a headrest 64 and a coverstock 66. The coverstock 66 is generally disposed completely over the seat base portion 60 and the seat back portion 62. Moreover, the coverstock 66 is configured to provide a uniform look and feel to the vehicle seating assembly 20. Additionally, the coverstock 66 forms a passenger engagement surface on a top surface 68 of both the seat base portion 60 and the seat back portion 62 of the vehicle seating assembly 20. Moreover, the vehicle seating assembly 20 may include one or more controllers 69 having functions such as a climate control system 75, a heater mat, thigh extensions, thigh bolsters, etc. The support structure 22 also includes a lip 73 disposed on a forward portion 74 of the support structure 22 which is configured to support the seat cushion insert 34. The lip 73 extends across the entire forward portion 74 and holds the seat cushion insert 34 on each side portion 72.

Referring now to the embodiment shown in FIG. 4, the modular vehicle seating assembly 20 includes the composite support structure 22 which is formed by the lower pressure compression mold. The support structure 22 has an open shell construction which allows for storage of the controller 69 that is operably coupled with other components, namely the climate control system 75, heater mat or other electronic functional device, to be stored underneath the support structure 22. The support structure 22 generally includes a center portion 70 and two side portions 72 disposed on either side of the center portion 70. Each of the side portions 72 and the center portion 70 are generally rectangular support structures with each of the side portions 72 usually being larger than the center portion 70. Each of the side portions 72 have generally square open sections 24 such that storage underneath the vehicle seating assembly 20 is possible. Moreover, and importantly, the composite support structure 22 provides support to the vehicle seating assembly 20 such that the vehicle seating assembly 20 of the present invention does not include a frame and defines a frameless seating assembly. In the embodiment illustrated in FIG. 4, the center portion 70 is continuous and connects the side portions 72. However, it is also contemplated that the center portion 70 may also include an open section 24.

Referring now to the embodiment shown in FIG. 5, disposed over the composite support structure 22 is the sub-assembly 26. The sub-assembly 26 is generally includes a polyurethane foam. However, it is also contemplated that the sub-assembly 26 may include another type of foam such as a memory foam, soft foam, or other foam as known to one of ordinary skill in the art. The sub-assembly 26 includes the trim piece 28 which is disposed over the center portion 70 of the support structure 22. The trim piece 28 further defines the center seat 30. The sub-assembly 26, and more specifically the trim piece 28, may also include a wire structure disposed inside of the trim piece 28 in order to give extra rigidity to the sub-assembly 26 and ultimately the vehicle seating assembly 20. However, it is also contemplated that the sub-assembly 26 may include just foam and may not include wire or other metal materials. The sub-assembly 26 is disposed on outside edges of the side portions 72 of the support structure 22 and connect along the forward portion 74 of the composite support structure 22 such that the open section 24 of the side portions 72 remain open.

Referring now to the embodiments shown in FIGS. 5-9, the sub-assembly 26 also includes at least one, and usually multiple, cushion attachment supports 32. The cushion attachment supports 32 are disposed adjacent to the open section 24. The attachment supports 32 may be disposed around a perimeter 80 of the open section 24. The attachment supports 32 may be steel attachment supports such that mechanical connection of the attachments supports 32 is included. However, it is also contemplated that the cushion attachment supports 32 may be Velcro, or another type of fixing means as known by one of ordinary skill in the art which would be sturdy enough to withstand the movement of the vehicle 40 while allowing attachment to be by a non-mechanical, and repositionable means.

Referring now to the embodiment shown in FIGS. 5 and 6, the seat cushion insert 34 is disposed over each of the open sections 24 on either side of the center seat 30 and defines the side seats 36. The seat cushion insert 34 is operably coupled to the cushion attachment support 32 in order to be securely held onto the vehicle seating assembly 20. As shown in the embodiment illustrated in FIG. 6, a suspension mat 90 may be disposed over the open section 24 of the composite support structure 22 prior to the insertion of the seat cushion insert 34. The suspension mat 90 is disposed completely over the open section 24 and is configured to provide additional comfort to a vehicle passenger. The suspension mat 90 provides rigidity such that the seat cushion insert 34 does not collapse under the weight of the vehicle passenger. The seat cushion insert 34 is then disposed on top of the suspension mat 90.

Referring again to the embodiment shown in FIG. 5, the seat cushion insert 34 is generally made of polyurethane foam. However, it is also contemplated that the seat cushion insert 34 may include of a memory foam or other soft foam as known by one of ordinary skill in the art. Additionally, similar to the trim piece 28 of the sub-assembly 26, the seat cushion insert 34 may also include a wire structure disposed inside of the seat cushion insert 34 in order to provide extra rigidity to the vehicle seating assembly 20. However, it is also contemplated that the seat cushion insert 34 is made only of foam and does not include any metal structure.

Referring again to the embodiments shown in FIGS. 5-9, the seat cushion insert 34 may be a generally rectangular seat cushion insert 34 similar to a standard vehicle seat cushion. As shown in the embodiment illustrated in FIG. 5, the seat cushion insert may include an intermediate recessed portion 94 with side bolsters 96 disposed on either side of the intermediate recessed portion 94. However it is also contemplated that the seat cushion insert 34 may be a specialized vehicle seat cushion such that the seat cushion insert 34 includes thigh supports 100 such as thigh bolsters, thigh tilts, thigh extensions, cushion extensions, or other inserts such as the climate control system 75, and/or split-leg supports. Moreover, the seat cushion insert 34 may be easily removable such that one seat cushion insert 34 may be removed and replaced with a seat cushion insert 34 having a different or additional functionality. This allows manufactures of the vehicle seating assembly 20 to easily customize vehicle seating assemblies 20 based on consumer's desires. Additionally, it also allows consumers to upgrade functionality of the vehicle seating assembly 20 even after the vehicle 40 is purchased and used by the consumer. Additionally, and as shown in the embodiment illustrated in FIG. 8, a bottom surface 102 of the seat cushion insert 34 may also include cushion attachment supports 32 such as Velcro strips or other adhering strips. However, as described above, it is also contemplated that the bottom surface 102 of the seat cushion insert 34 may include brackets, as illustrated in the embodiment shown in FIG. 9, or other affixing means in order to securely hold the seat cushion insert 34 onto the vehicle seating assembly 20.

Referring again to the embodiment shown in FIG. 6, the thigh supports 100 can be operably coupled to the suspension mat 90 which is disposed over the open section 24. The thigh supports 100 are disposed on the front surface 74 of the support structure 22 and placed such that the thigh supports 100 would come into contact with thighs of a vehicle passenger when the vehicle passenger is seated on the vehicle seating assembly 20. The thigh supports 100 are generally rectangular inserts and are disposed in abutting contact with the sub-assembly 26 and the support structure 22. Moreover, the thigh supports 100 may be split thigh supports 130, 132 such that the thigh supports 100 include a right thigh support 130 and a left thigh support 132 which correspondingly engage the vehicle passenger's right thigh and left thigh. However, it is also contemplated that the thigh supports 100 may be a single thigh support 100. It is also contemplated that only one of the side seats 36 may include the thigh supports 100.

Referring now to the embodiments shown in FIGS. 7 and 8, as illustrated in the embodiment shown in FIG. 7, the seat cushion insert 34 may be fixed to the sub-assembly 26 only on a rear portion 110. Having the cushion attachment support 32 disposed only on the rear portion 110 of the seat cushion insert 34 allows a front portion 112 of the seat cushion insert 34 to move to a substantially vertical position 116. When the seat cushion insert 34 is in the substantially vertical position 116, the seat cushion attachment supports 32 are configured to pivot thereby allowing the seat cushion insert 34 to reveal the open section 24. Again, the open section 24 may be configured to hold a controller 69 which may house multiple functional aspects of the vehicle seat.

Referring again to the embodiments shown in FIGS. 7 and 8, a bottom surface 102 of the seat cushion insert 34 may also include a storage pocket 120. The storage pocket 120 may be used by the manufacturer to house the controller 69 which provides additional electronic features to the vehicle seating assembly or may provide convenient hidden storage for a rear vehicle passenger. As shown in the embodiment shown in FIG. 8, it is also contemplated that the cushion attachment supports 32 will be disposed completely around the open section 24 such that both the front portion 112 and the rear portion 110 of the seat cushion inserts 34 are fixedly attached to the composite support structure 22. In the embodiment illustrated in FIG. 8, the cushion attachment support 32 disposed on the support structure 22 are multiple strips of adhesive, however, it is also contemplated that the cushion attachment supports 32 could be metal brackets, Velcro or other fixing means as described above.

Figure 9:
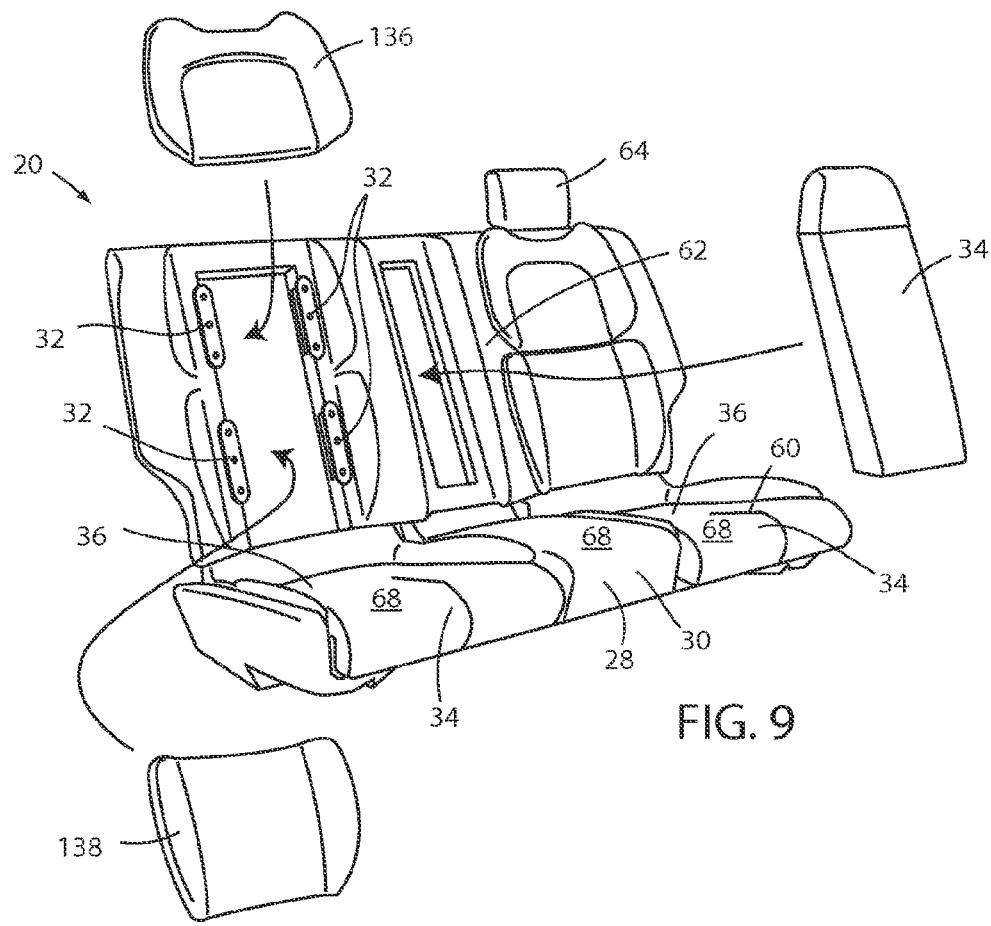
FIG. 9 is a front perspective view of the vehicle seating assembly according to one embodiment of the present invention.
Figure 10:
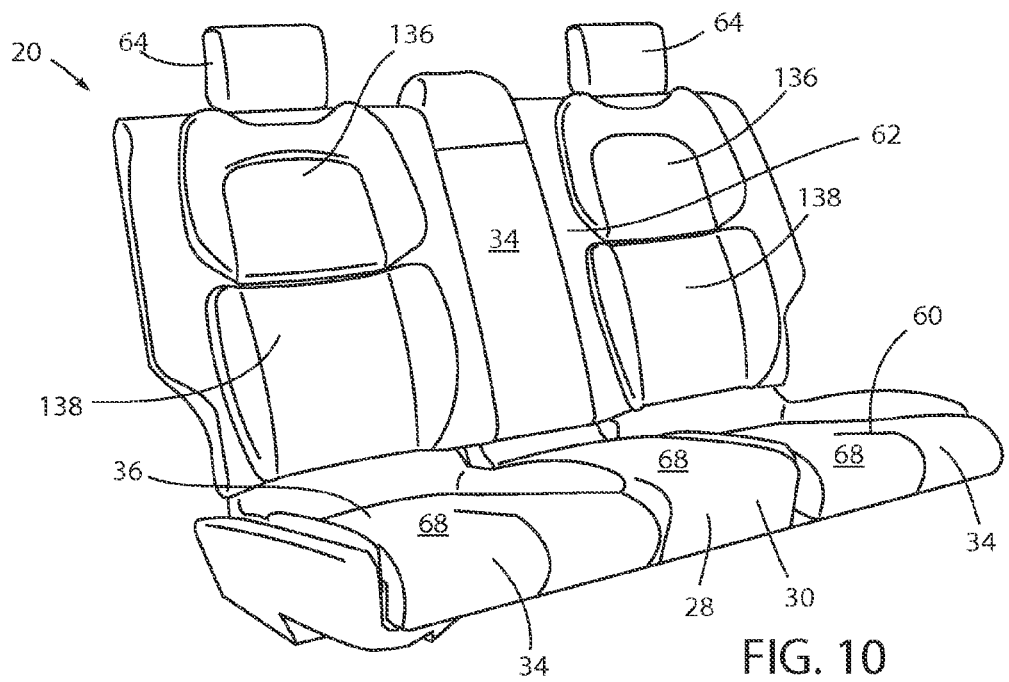
FIG. 10 is a front perspective view of the vehicle seating assembly according to one embodiment of the present invention.
Figure 11:
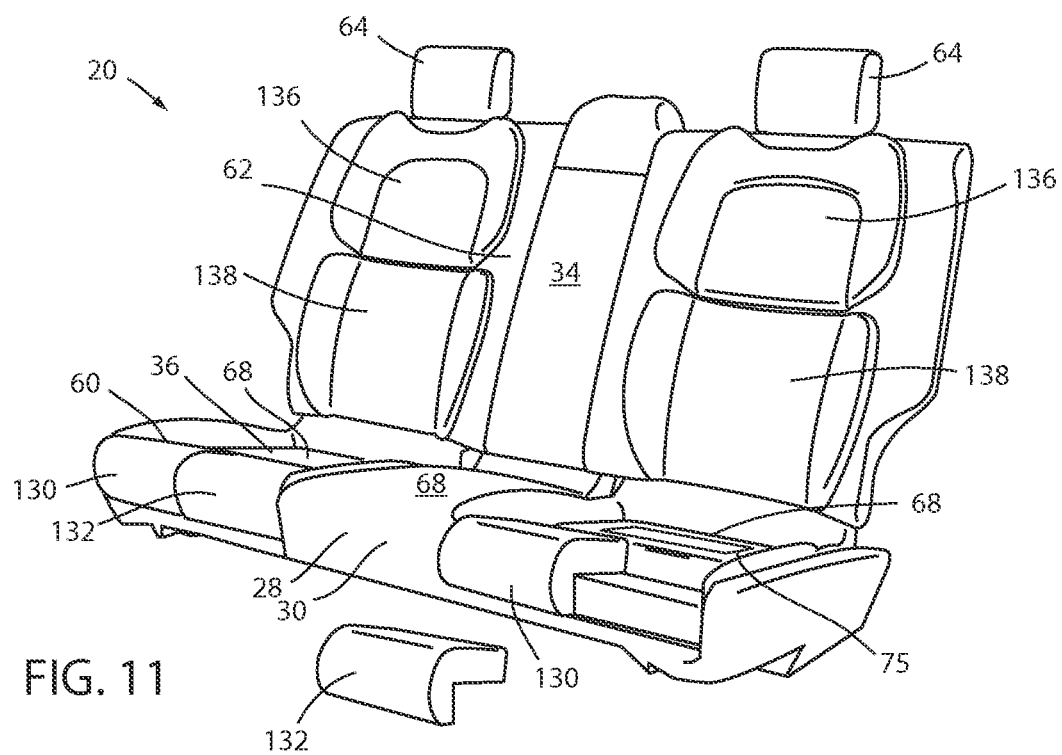
FIG. 11 is a front perspective view of the vehicle seating assembly according to another embodiment of the present invention.
Figure 12:
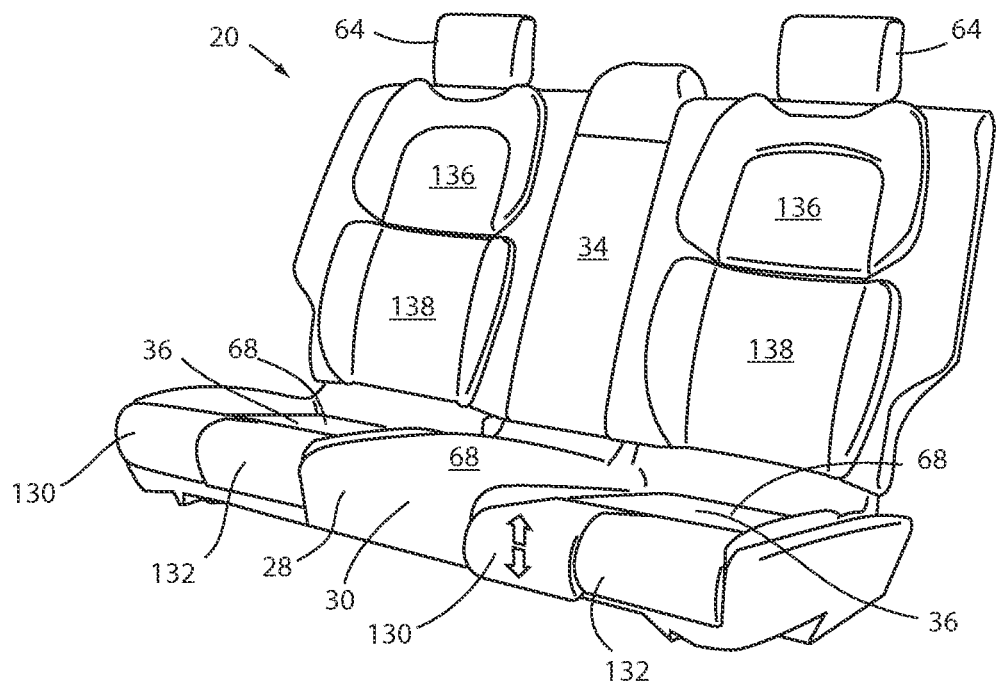
FIG. 12 is a front perspective view of the vehicle seating assembly according to yet another embodiment of the present invention.

Referring now to the embodiment shown in FIG. 9, the vehicle seating assembly 20 may include many of the same features as described above, including the coverstock 66, the composite support structure 22 formed by a lower pressure compression mold which defines at least one open section 24, the sub-assembly 26 disposed over the composite support structure 22, the trim piece 28 formed on the sub-assembly 26 and defining the center seat 30, the cushion attachment support 32 disposed adjacent to the open section 24, and the seat cushion insert 34 disposed over the open section 24 and defining the side seat 36. Moreover, as shown in the embodiment shown in FIG. 9, the embodiment of seat back portion 62 of the vehicle seating assembly illustrated in FIG. 9, may have the three piece design similarly as described above and illustrated in FIGS. 5-8 with respect to the seat base portion 60. However, as illustrated in FIG. 9, the seat cushion insert 34 may be divided into multiple seat cushion inserts such as a upper cushion insert 136, configured to engage an upper back of the vehicle passenger, and a lower seat cushion insert 138 which is configured to engage a lower back of the vehicle passenger. Moreover, in the embodiment shown in FIG. 9, the trim piece 28 integrally formed on the sub-assembly 26 may not define a center seat 30 such that the center seat 30 includes at least one cushion attachment support 32 and a seat cushion insert 34 which defines the center seat 30, similar to the embodiment shown defining the side seat 36. However, it is also contemplated that similar to the embodiment described above, the trim piece 28 defines a center seat 30 on the sub-assembly 26 and does not include the additional cushion insert 34.

Referring now to the embodiment shown in FIGS. 9-12, in operation, first, the composite support structure 22 is formed by the low pressure compression mold. The composite support structure 22 is a shell which allows for storage of other components below the composite support structure 22. Additionally, the composite support structure 22 defines open sections 24 and usually two side open sections 24. The sub-assembly 26 is disposed over the composite support structure 22. The sub-assembly 26 includes the trim piece 28 which is integrally formed on the sub-assembly 26 and defines the center seat 30. The least one cushion attachment support 32 is disposed around the open section 24. The at least one seat cushion insert 34 is operably coupled and usually fixedly coupled to the at least one cushion attachment support 32 in order to attach the seat cushion insert 34 to the vehicle seating assembly 20. The seat cushion insert 34 is disposed over each of the open sections 24 and defines the side seats 36. Additionally, the seat cushion insert 34 may include single thigh supports 100, which may be a single thigh support 100 or separate thigh supports 130, 132 including a right thigh support 130 and a left thigh support 132. The thigh supports 100 are configured to tilt or extend in order to provide increased comfort to the vehicle passenger. Moreover, the right and left thigh supports 130, 132 may be configured to move independently of one another, as shown in the embodiment illustrated in FIG. 12. It is also contemplated that the controller 69 housing the climate control system 75, the heater mat, or other functional elements may be disposed in the seat cushion insert 34 or disposed below the composite support structure 22.

Yet another aspect of the present invention is to provide a method of creating a modular vehicle seat design which allows easy customizability in order to increase value and comfort to the vehicle passenger. Prior vehicle seat methods include using a single piece of polyurethane foam in order to create a vehicle seating assembly. Using a single piece of foam makes it difficult to add functionality or other customizable features as desired by consumers. Additionally, the large volume of foam needed to create a prior art vehicle seat takes up valuable packaging space and also traps heat which reduces functionality. Moreover, styling and other visual features are limited when using a single piece of polyurethane foam to create the vehicle seating assembly. The present invention uses the three piece design which begins with the composite support structure 22 which is formed by a low pressure compression mold. The composite support structure 22 is a shell which allows for storage of other components and also holds a suspension mat 90 in order to provide increased comfort to the vehicle passenger. The sub-assembly 26 is disposed over the composite support structure 22 and includes a trim piece 28 formed on the sub-assembly 26 which defines a center seat 30. The seat cushion insert 34 is operably coupled to the cushion attachment supports 32 which are disposed adjacent to the open section 24. Moreover, the seat cushion insert 34 is disposed over the at least one open section 24 and defines a side seat 36. The seat cushion insert 34 is customizable and can include the controller 69 which may house the climate control system 75, the heater mat, or thigh supports 100 which may extend or tilt to provide additional comfort to the vehicle passenger. Importantly, the vehicle seating assembly 20 of the present invention is a frameless design and does not utilize a traditional seat frame.

It is to be understood that variations and modifications can be made on the aforementioned structure without departing from the concepts of the present invention, and further it is to be understood that such concepts are intended to be covered by the following claims unless these claims by their language expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
   a composite support structure formed by a lower pressure compression mold and defining first and second open sections;
   a subassembly disposed over the composite support structure and including a trim piece integrally formed on the subassembly and defining a center seat disposed between the first and second open sections and a cushion attachment support disposed adjacent to each of the first and second open sections; and
   a seat cushion insert operably coupled to the cushion attachment support and disposed over the first open section and defining a side seat.

2. The vehicle seating assembly of claim 1, wherein the vehicle seating assembly is frameless.

3. The vehicle seating assembly of claim 1, further comprising:
   a suspension mat disposed between the composite support structure and the seat cushion insert.

4. The vehicle seating assembly of claim 1, wherein the seat cushion insert includes independent right and left thigh supports.

5. The vehicle seating assembly of claim 1, wherein the seat cushion insert includes a cushion extension.

6. The vehicle seating assembly of claim 1, wherein the seat cushion insert includes a climate control system.

7. The vehicle seating assembly of claim 1, wherein the subassembly is formed from polyurethane foam.

8. A frameless seating assembly for a vehicle comprising:
   a low pressure compression molded composite support structure defining first and second open seat sections and first and second open seatback sections;
   an overmolded subassembly operably coupled to the composite support structure and defining a center seat that is disposed between the first and second open seat sections; and
   cushion inserts coupled to cushion attachment supports of the support structure, the cushion inserts being disposed over the first and second open seat sections and seatback sections to define first and second side seating units.

9. The frameless seating assembly of claim 8, wherein a forward portion of the support structure includes a lip configured to support the cushion inserts.

10. The frameless seating assembly of claim 8, wherein each of the cushion inserts includes independent right and left thigh supports.

11. The frameless seating assembly of claim 8, wherein each of the cushion inserts includes a cushion extension.

12. The frameless seating assembly of claim 8, wherein each of the cushion inserts includes a climate control system.

13. The frameless seating assembly of claim 8, wherein the overmolded subassembly is formed from polyurethane foam.

14. A vehicle seating assembly comprising:
   a low pressure compression molded composite support structure;
   a subassembly disposed over the composite support structure and defining a center seat and first and second side openings; and
   first and second seat cushion inserts disposed over the first and second side openings and operably coupled via snap-fit connection with the support structure, and including first and second independent thigh supports that are one of extendable and tiltable.

15. The vehicle seating assembly of claim 14, wherein the vehicle seating assembly is free of any metallic frame.

16. The vehicle seating assembly of claim 14, further comprising:
   a suspension mat disposed between the composite support structure and the first and second seat cushion inserts.

17. The vehicle seating assembly of claim 14, wherein a forward portion of the support structure includes a lip configured to support the first and second seat cushion inserts.

18. The vehicle seating assembly of claim 14, wherein each of the first and second seat cushion inserts includes an intermediate recessed portion with side bolsters.

* * * * *